United States Patent [19]

Rise et al.

[11] Patent Number: 5,691,756
[45] Date of Patent: Nov. 25, 1997

[54] PRINTER MEDIA PREHEATER AND METHOD

[75] Inventors: James D. Rise, Lake Oswego; William Y. Pong, Tualatin; Timothy L. Crawford, Tigard; Meade Neal, Mulino; Larry E. Hindman, Woodburn; Carl T. Urban, Lake Oswego, all of Oreg.

[73] Assignee: Tektronix, Inc., Wilsonville, Oreg.

[21] Appl. No.: 358,138

[22] Filed: Dec. 16, 1994

Related U.S. Application Data

[63] Continuation-in-part of Ser. No. 981,646, Nov. 25, 1992, Pat. No. 5,389,958.

[51] Int. Cl.⁶ ........................................................ B41J 2/01
[52] U.S. Cl. ............................................... 347/102; 347/103
[58] Field of Search ...................................... 347/101, 102, 347/103, 151, 185; 400/120.18; 101/424.1, 488; 355/290, 282, 283, 284, 285, 295; 399/328, 335, 338; 219/216, 255, 469–471

[56] References Cited

U.S. PATENT DOCUMENTS

| | | | |
|---|---|---|---|
| 4,446,471 | 5/1984 | Yano | 347/151 |
| 4,755,849 | 7/1988 | Tarumi et al. | 355/290 |
| 4,963,884 | 10/1990 | Kiguchi et al. | 347/185 |

FOREIGN PATENT DOCUMENTS 0073867  4/1985  Japan ..................................... 400/120

Primary Examiner—Benjamin R. Fuller
Assistant Examiner—L. Anderson
Attorney, Agent, or Firm—Ralph D'Alessandro; Bennett K. Langlotz

[57] ABSTRACT

A media preheater positioned in the media path of a printer and having a fixed heater and a movable plate array biased toward the heater such that printing media passing between the heater and the plate array is compressed therebetween and heated. The preheater may be positioned upstream of a print head and downstream of a media advancing mechanism in the media path. More than one plate may be provided in the plate array to accommodate non-planarity of the heater or the printing medium. The plate array may be a thermally massive element that contacts the heater when no media is present, thereby permitting the medium to be heated from both sides.

16 Claims, 4 Drawing Sheets

6,691,756

1

PRINTER MEDIA PREHEATER AND METHOD

CROSS REFERENCE TO RELATED APPLICATION

This application is a continuation-in-part of 07/981,646, filed Nov. 25, 1992 now U.S. Pat. No. 5,389,958, issued Feb. 14, 1995, which is incorporated herein by reference in pertinent part.

FIELD OF THE INVENTION

This invention relates to computer printers and, more particularly, to apparatus for preheating printing media, such as paper and transparency film.

BACKGROUND OF THE INVENTION

Some conventional printer systems require printing media to be uniformly preheated prior to printing to provide an aesthetic and durable output. Typical heaters employ radiant or convective heat sources adjacent to the paper path and "upstream" of the print head. These existing heaters have several disadvantages. A lack of uniformity in heating can cause non uniform printer output, and media warping or cockle. Warping can further aggravate non uniformity by bringing some portions of the medium closer to the heat source than other portions.

Existing heaters are less thermally efficient than is desirable, requiring high power consumption to preheat a sheet to a given temperature, and generating excess heat that must be dissipated. The excess heat increases the environmental temperature of other components in the printer housing, thereby threatening component reliability and operating life. Excess heat can require additional time for the temperature to stabilize in the printer to obtain uniform print output. In addition, excess heat is unwelcome in an office environment, and may pose a safety hazard or require cool-down delays for internal servicing of a printer.

These problems are solved in the design of the present invention by providing a media preheater having at least one movable platelet cooperative with a fixed heater plate.

SUMMARY OF THE INVENTION

The present invention avoids the disadvantages of existing devices and techniques by providing in the paper path of a printer: a media preheater having a fixed heater plate and at least one movable platelet biased toward the heater plate such that printing media passing between the heater plate and the platelet is compressed therebetween.

The preheater may be positioned upstream of a print head or a transfer nip and downstream of a paper advancing mechanism in the paper path. More than one platelet may be provided to accommodate non planarity of the heater plate or the printing medium. The platelet may be a thermally massive element that contacts the heater plate when no media is present, thereby drawing energy for uniformly heating the media from both sides.

Preheating of media may be effected by advancing a sheet across a heated element while biasing the sheet against the heated element, advancing the sheet to a printing or transfer mechanism, and generating an image on the sheet.

BRIEF DESCRIPTION OF THE DRAWINGS

These and other objects, features and advantages of the invention will become apparent upon consideration of the following detailed disclosure of the invention, especially when it is taken in conjunction with the accompanying drawings wherein.

DETAILED DESCRIPTION OF A PREFERRED EMBODIMENT

Figure 1:
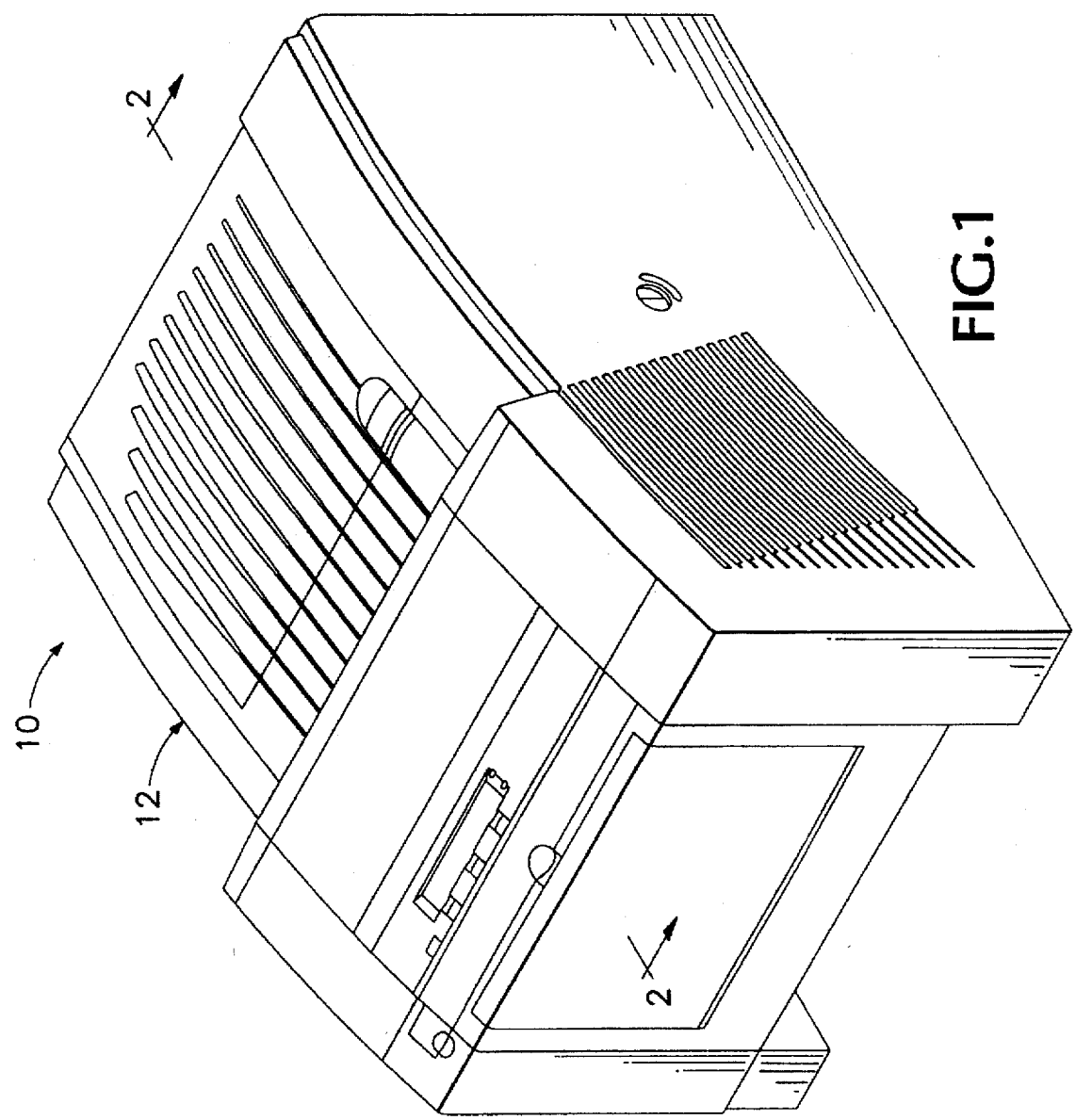
FIG. 1 is a perspective view of a printer including a preferred embodiment of the invention.
Figure 2:
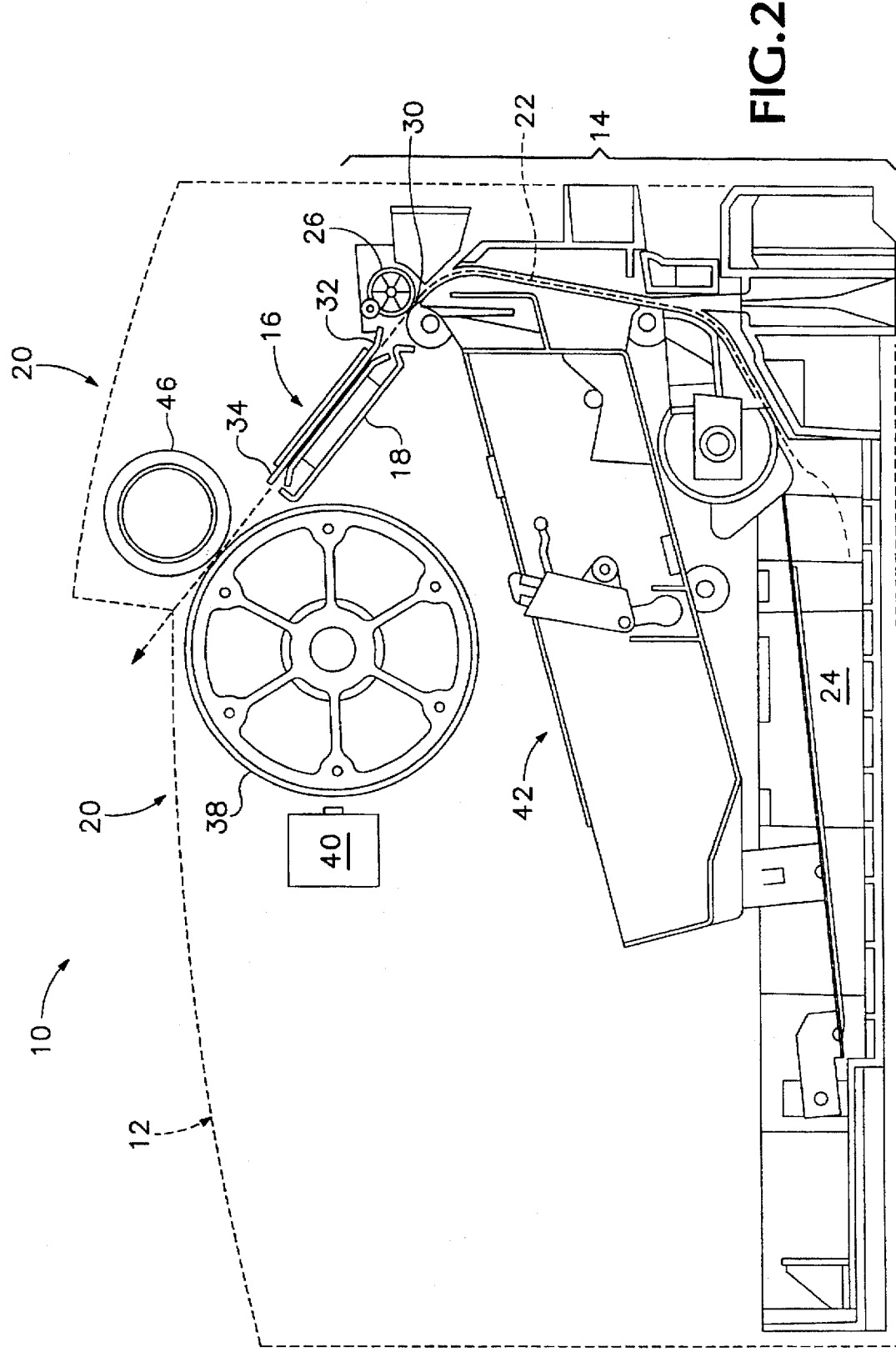
FIG. 2 is a sectional side view of the printer of FIG. 1 taken along a line bisecting the printer from the front to the back.

FIG. 1 shows a computer printer 10 having a housing 12. In FIG. 2, the paper or media path 22 and the major functional elements of the printer are illustrated. A paper feed system 14, a preheater assembly 16, and a printing assembly 20 are arranged within the housing 12 in sequence to define a paper path 22 shown in dashed lines. The feed system 14 draws a sheet from a supply tray 24, and expels the sheet from a pair of feed rollers 26 forming a nip 30 that defines a portion of the paper path 22. At least one of the rollers 26 is driven to advance the sheet.

The heater assembly 16 has an inlet edge 32 and an outlet edge 34, and is essentially an elongated planar body positioned with its inlet edge 32 immediately adjacent to the feed rollers 26. The heater assembly 16 is oriented in a plane intersecting the nip 30 and tangent to the roller surfaces at the nip, such that the paper path 22 exits the nip in a line that passes through the heater assembly.

The printing assembly 20 includes a rotating drum 38 that provides an intermediate transfer surface upon which images may be printed by a print head 40 and transferred to the sheet of printing medium. In the preferred embodiment, a liquid release film is applied to the drum surface by a drum maintenance assembly 42 positioned adjacent to and below the drum. The print head 40 applies a phase-change ink in a liquid or molten state to form an image on the film coating the drum. The drum rotates to bring the image toward the paper or media path 22. The media passes between the drum and a transfer roller 46 that is biased against the drum during image transfer. Under the pressure of the transfer roller, the ink will transfer to the sheet, which is then fed out of the housing 12, while the ink solidifies as it cools.

Figure 3:
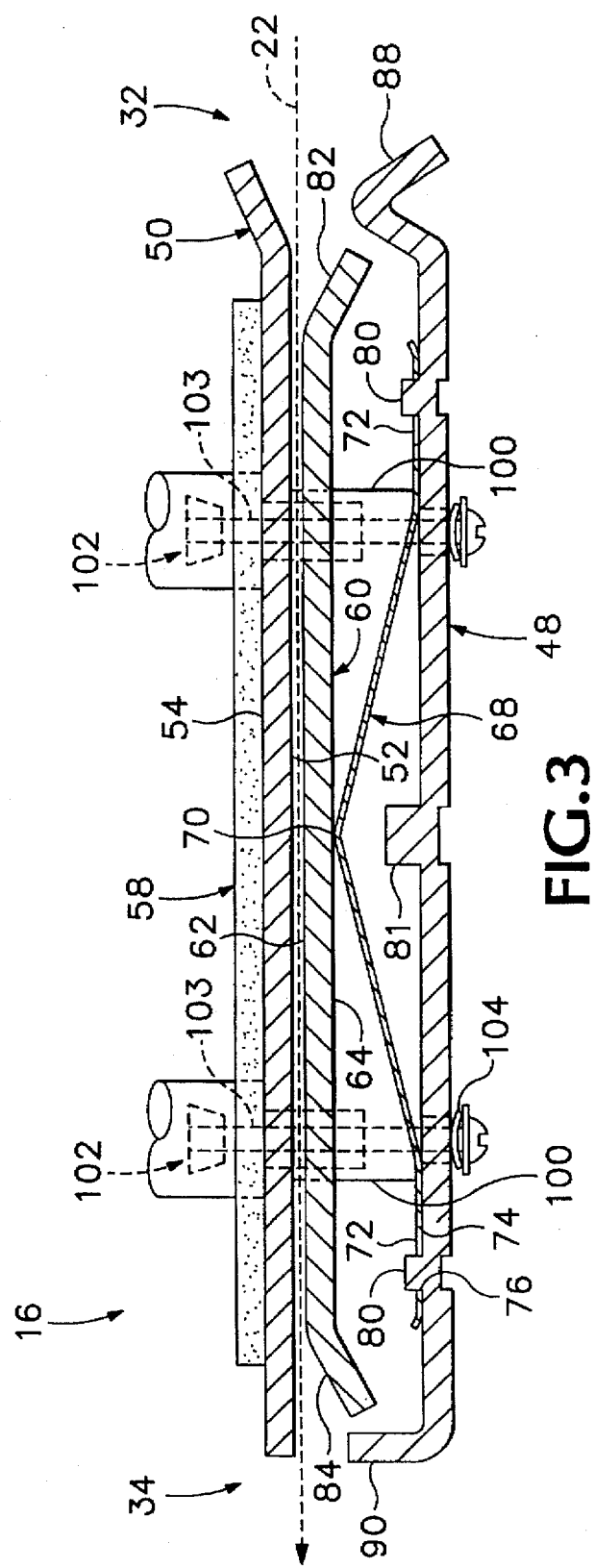
FIG. 3 is an enlarged sectional side view of the media pre-heater assembly of the preferred embodiment.

FIG. 3 shows the heater assembly 16 with the paper path 22 passing through from right to left in an upstream-to-downstream direction. The heater assembly includes a rigid base plate 48, preferably made of aluminum, below the paper or media path 22, and a rigid heater plate 50 spaced above the base plate 48 and having a flat inner surface 52 facing the base plate 48 and defining the upper boundary of the paper or media path. The heater plate 50 has an opposing outer surface 54 to which a resistive sheet heating element 58 is laminarly attached to be substantially coextensive with the heater plate. The heating element is designed to provide somewhat more heat at the edges and corners to compensate for heat losses at the edges of the plate 50, resulting in a uniformly heated plate 50.

Five rigid planar metal platelets 60, preferably made of aluminum, are independently positioned above the base plate 48 and below the heater plate 50. Each platelet has a flat inner surface 62 and an opposing outer surface 64. For each platelet, a leaf spring 68 is mounted to the base plate 48 to press against a central region on the outer surface of the respective platelet so that the platelet's inner surface 62 is biased against the inner surface of the heater plate 50. Thus, the platelets 60 contact the heater plate over substantially their entire adjacent surface areas, so that they are thermally sinked to the heater plate 50 when a media sheet is not passing therebetween. The thermal mass of the platelets 60 relative to printing media allows the platelets to serve as a heat source for heating the media sheet equally from both sides. This causes the media sheet to be more thoroughly heated in the briefest possible time, but without the disadvantages of excessive heater temperatures. By this thorough heating heavier media sheets, such as card stock, are less susceptible to cooling before the image is transferred. A heavy media sheet heated on a single side will change temperature as heat is conducted from the heated side to the unheated side.

Figure 4:
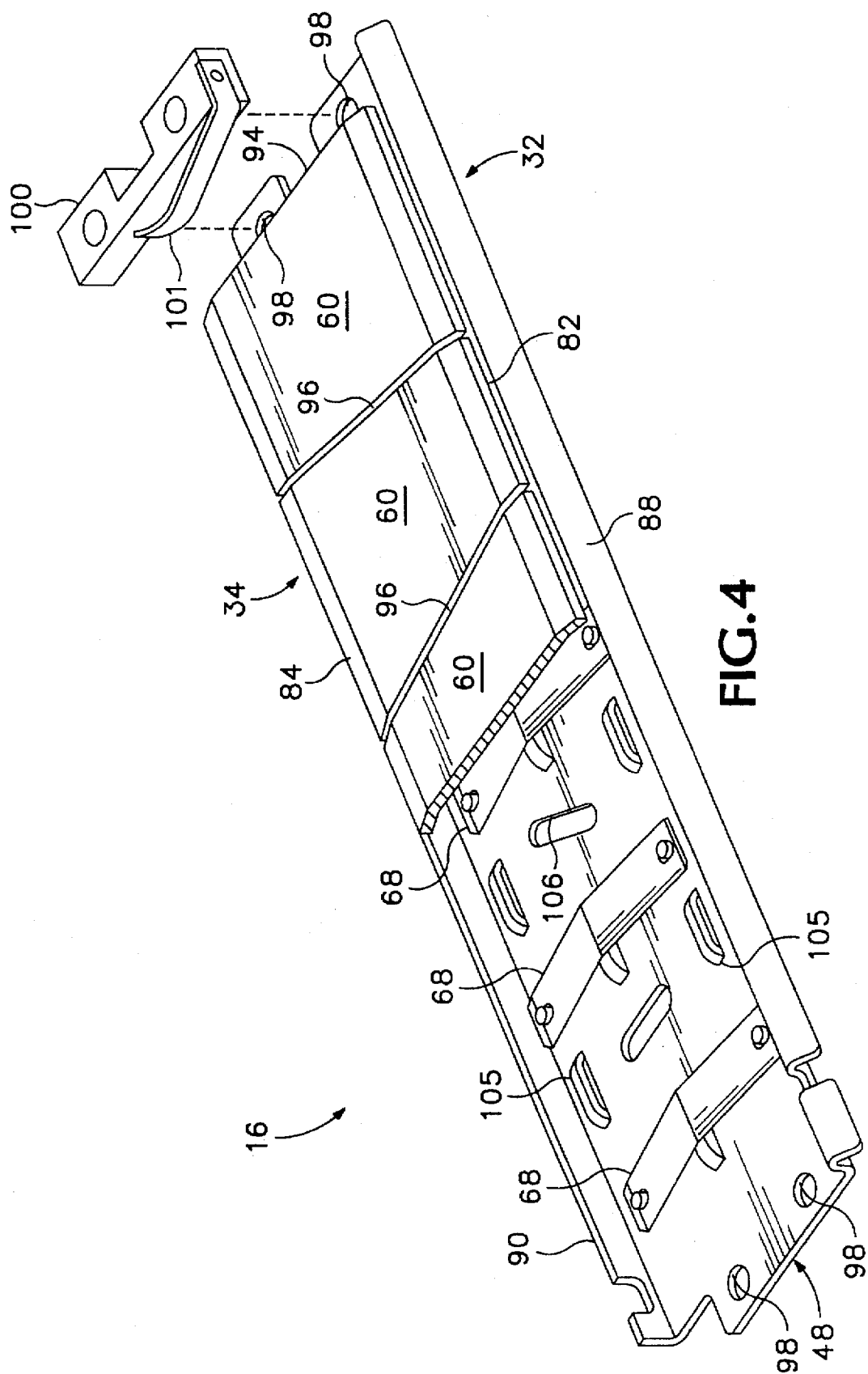
FIG. 4 is a perspective view of a portion of the media pre-heater assembly of FIG. 3 showing a spacer with a lateral biasing spring in exploded view.

As seen is FIGS. 3 and 4, each leaf spring 68 is an elongated rectangle of stainless steel having limited thermal conductivity, with a bisecting crease to form an inverted V-shaped cross section with a peak 70 pressing against the outer surface 64 of platelet 60 and its ends resting on the base plate 48. Each platelet 60 has the same spring load exerted on it, with the loading being directed at the area centroid of the platelet 60. Each respective end of each spring defines an elongated slot 72 having an inner limit 74 and an outer limit 76.

For each spring 68, the base plate 48 includes a pair of partially perforated or semi-perforated bosses 80 protruding toward the platelets 60. Each boss 80 is sized to fit within a spring slot, but each pair of bosses 80 is spaced apart sufficiently wide to require flexing of the spring 68 in order to spread apart the slots 72 wide enough for the slots to simultaneously encompass the bosses. This allows the springs 68 to be installed on the base plate 48 and thereafter to be self retaining during assembly by the force of the outer limits 76 of the slots 72 against the bosses 80, as best seen in FIG. 3. The inner limit 74 of each slot 72 must be located sufficiently near the center of the spring 68 to permit the ends of the spring 68 to slide freely outwardly when the spring is fully compressed downwardly toward a flattened condition. Each boss 80 must be sufficiently tall to present a nearly perpendicular edge on which the spring 68 may grip. The base plate 48 also includes a central protrusion 81 for each platelet 60, centered below a respective spring peak 70. This provides a stop to prevent platelets 60 from being excessively biased away from the heater plate 50 by preventing the springs 68 from being pushed flat causing yielding due to excessive deflection and possibly damaging the springs. If this were to occur, such as by a shock during printer shipping, one platelet 60 could irretrievably overlap another instead of maintaining the required side-by-side coplanar arrangement. A pair of similar protrusions 105 can also be employed intermediate each pair of central protrusions 81, but aligned generally with the bosses 80 across the width of the base plate 48 to help retain the platelets 60 adjacent and interiorly of the inlet and outlet edges 82 and 84 from shifting front to back.

The platelets 60 are laterally loaded by a leaf spring 101 that is appropriately mounted, such as by a screw, to one of the spacers 100 as seen in FIG. 4 to keep the platelets 60 together as described above. Spring 101 loads the platelets 60 against the opposing spacer 100 (not shown) that is mounted in the mounting holes 98 visible on the left side of base plate 48 of FIG. 3. This lateral loading prevents spaces from occurring between the platelets 60, thereby avoiding any cold strips in the media as it passes over the platelets 60 and preventing damage from dropping, as may occur during shipping of the printer. Viewing windows or openings 106 can be provided in base plate 48 over the junctions or angles borders 96 to permit inspection prior to operation after shipping to ensure the edges of platelets 60 are not overlapped or the platelets 60 are not otherwise misaligned.

The components of the heater assembly 16 are constructed and arranged to facilitate the smooth passage even of thin sheets of flexible media without excessive friction or buckling. This is critical because the feed rollers 26 must push the sheet through the heater assembly 16. Positioning of feed rollers in the midst of or following the heater assembly 16 would compromise thermal uniformity by creating cool spots where such feed rollers contacted the sheet. To provide a smooth entry, the heater plate 50 is flared upwardly away from the media or paper path 22 at the inlet edge 32. Similarly, each platelet 60 is flared or angled downwardly away from the paper path 22, both at its inlet edge 82 and at its outlet edge 84, to avoid catching or interfering with the passage of the media as it travels along path 22. Also, the base plate 48 includes an inlet flange 88 and an outlet lip 90. The flange 88 and lip 90 are elevated above the center of the base plate 48 to form a basin in which the platelets 60 are loosely captured against shifting laterally out of the basin in the directions of the inlet or outlet. The inlet flange 88 is flared downwardly away from the paper path 22 to funnel sheets into the heater assembly 16 between platelets 60 and heater plate 50.

The respective inner surfaces 52 and 62 of the heater plate 50 and the platelets 60 are coated with a thin, low friction coating formulated for high thermal conductivity and high temperature stability. Coatings such as used on non-stick cookware are suitable, particularly carbon-loaded Teflon such as Silverstone® from E.I. DuPont de Nemours & Company. Such coatings also help to drain static charge that could build up on the platelets 60, creating a drag on media such as paper traveling along the path 22 or which could create an electrostatic discharge that could destroy electro-optic sensors used in the printer.

The heater plate 50 and platelets 60 are preferably formed of a high conductivity metal such as aluminum alloy 5052 or 5050. The base plate 48, which is thermally isolated from the heater plate 50 and platelets 60, may be formed of the same material or any other rigid, thermally stable material.

FIG. 4 shows the base plate 48 with all springs 68 attached, and with two platelets installed, two platelets removed, and one platelet longitudinally bisected. Each platelet 60 has a trapezoidal profile. The end platelets have end or exterior edges 94, only one of which is shown in FIG. 4, perpendicular to the parallel inlet and outlet edges 82, 84, so that the assembled array of platelets has a rectangular profile corresponding to a major portion of the heater plate 50. The other divisions between adjacent platelets form interior edges that are angled about 15 degrees from the perpendicular with respect to the inlet and outlet edges 82, 84. The interior edges of adjacent platelets abut, but are free to move laterally. The junctions or angled borders 96 allow free and independent movement of the platelets 60 toward and away from the heater plate 50 of FIG. 3. The angled junctions or borders 96 alternate in their offset direction from the perpendicular, resulting in symmetrical keystone shapes for the three inner platelets. Angled parallel borders would yield parallelogram-shaped platelets, and may give undesirable lateral shifting of the platelets 60 or a media sheet in one direction. The angled borders 96 prevent any point on a media sheet traveling along path 22 from spending more than a minimal time over a gap or junction and ensure contact of the media sheet with the preheated platelets 60 across the entire surface of the media sheet as it travels along path 22. This ensures uniformity of heating of the media sheet and prevents a media sheet from having a common area that will pass over a junction between two adjacent platelets 60 along the entire length of the media sheet as the sheet travels along path 22 through the printer 10.

The base plate 48 of FIG. 4 defines a pair of mounting holes 98 at each end. The heater plate 50 of FIG. 3 defines a corresponding set of holes. As shown in FIG. 3, an insulating plastic spacer 100 resides in each of these holes, with shoulders to provide precise spacing between the base plate 48 and the heater plate 50. A boss in the heater plate 50 has a sonically welded threaded insert 102 inside into which an attachment screw 103 threads to secure the base plate 48 and the spacers 100 in position with the heater plate 50. The insulating properties of the spacers 100 minimize heat conduction to the base plate 48, improving temperature uniformity while reducing heat loss and energy consumption. It is necessary to accommodate thermal expansion of the heater plate 50 relative to the unheated base plate 48. Therefore, some of the mounting holes 98 may be oversized or slot shaped. Also, low force spring washers 104 may be used in conjunction with the attachment screws 103 to provide sufficient clamping force without binding, thus permitting shifting to occur in response to temperature changes.

Spacers 100, only one of which is shown in FIGS. 3 and 4, are made of a suitable plastic material with sufficient heat resistance to withstand the heat generated by the heater plate 50 against which they come into contact when placed on opposing sides of the base plate 48 adjacent the exterior edges of the platelets 60. The plastic can be any high temperature thermoplastic material, such as polyphenylene sulfide, or high temperature thermoset material.

During operation, the platelets 60 are continuously biased toward the heater plate 50. Each spring provides a force of about 0.16 pounds (0.71N), yielding a uniform pressure of about 0.050 lb/in$^2$ (345N/m$^2$.) Pressures may acceptably range between about 0.045 and about 0.052 lb/in$^2$ (310–360N/m$^2$.) The print media sheet is advanced at a preferred speed of about 5 inches per second throughout operation, and the heater plate 50 is maintained at a temperature of about 90° C. for paper, or about 95° C. for transparency film. This heats the media sheet to temperatures of about 70° C. to about 75° C. Other speeds and temperatures may be suitable for other materials and ink formulations. The media must be sufficiently heated to promote good ink adhesion, but must not be so overheated to reliquefy the ink and blur the image, or to damage the media itself. Considering all possible alternative media and ink formulations currently available, the heater plate temperature may acceptably range between about 80° C. and about 150° C., more preferably between about 85° C. and about 105° C., and most preferably between about 90° C. and about 100° C. Faster throughput rates will require higher plate temperatures to yield a given media temperature.

Occasionally, a sheet of preprinted media may be improperly fed through the printer, or a printer jam may occur, causing contamination of the heater surfaces with melted ink. To prevent contamination of subsequent output, the heater surfaces must be cleaned. To do so without the inconvenience or potential hazard of opening the heater for manual cleaning, an automatic cleaning sequence may be initiated. The heater surfaces are elevated from their normal operating temperatures by about 15°–20° C., or to about 110° C. This melts any ink contamination further into its liquid stage. In this stage, the ink is more readily wiped and absorbed by paper sheets that are fed through the printer via the normal paper path. As during normal operation, the heater surface temperatures are thermostatically maintained during cleaning to counteract the cooling effect of the heat absorbed by the paper. Preferably, about 10 sheets of letter sized paper are sufficient to remove detectable traces of contamination. An optical sensor may be used to detect when ink residue is adequately removed, avoiding the waste of time and paper that under or over cleaning may cause.

After cleaning, the heater surfaces must cool down to their normal operating temperature. Instead of a prolonged delay for passive convective cooling, the plates are conductively cooled by passage of paper without operation of the heating element. This proceeds until operating temperature is reached and thermostatically maintained by the heating element. Normally, about 5 sheets are required to cool the surfaces to the operating temperature, typically concluding the cleaning cycle.

While the invention has been described above with reference to specific embodiments thereof, it is apparent that many changes, modifications, and variations in the materials, arrangements of parts and steps can be made without departing form the inventive concept disclosed herein. For example, in employing the preheater apparatus of the present invention, the platelets 60 and the heater plate 50 could be reversed so that the platelets 60 are gravity hung and spring loading could be used to assist in holding them in place if necessary. It is to be understood that either one or both of the heater plate 50 and the series of platelets 60 may be thermostatically controlled to the desired temperature. The sheet of media passing therebetween may contact one or both of the surfaces as it travels along the path 22.

Accordingly, the spirit and broad scope of the appended claims is intended to embrace all such changes, modifications and variations that may occur to one of skill in the art upon a reading of the disclosure. All patent applications, patents and other publications cited herein are incorporated by reference in their pertinent part.

We claim:

1. A printer having a media preheater comprising:

a frame;

a media supply connected to the frame;

a print head connected to the flame;

a rigid heater connected to the frame, including an active heating element, and having a heater major inner surface;

a plate array formed by a plurality of rigid plates connected to the frame and having a plate outer surface facing the heater inner surface, the plate array being substantially coextensive with the heater and having two exterior edges and a plurality of interior edges;

the plate array being mounted to the frame for movement toward and away from the heater to accommodate media passing between the heater and the plate array; and the plate array being biased toward the heater, such that the plate array is in contact with the heater when no media is present, and such that media of a certain length passing between the heater array and plate is compressed therebetween to ensure flatness.

2. The apparatus of claim 1 wherein the rigid plates are each independently positioned and connected via springs to the frame such that planarity variations of the heater major surface may be tolerated.

3. The apparatus of claim 1 wherein the plurality of rigid plates have angled borders adjacent each interior plate edge such that media passing over the plurality of plates between the heater and the plurality of plates do not have a common area pass over an interior plate edge along the length of the media.

4. The apparatus of claim 3 wherein the plurality of interior edges form angled borders of about 15 degrees from the vertical.

5. The apparatus of claim 1 wherein the preheater is an elongated assembly arranged perpendicular to a media path axis extending from the media supply to the print head, and at least one of the plates abuts an adjacent plate at an edge angularly disposed from the paper path axis, such that substantially the entire surface of medium passing through the preheater is contacted by the heater or by at least one of the plates.

6. The apparatus of claim 1 wherein the rigid plates are formed of metal each having a thickness providing a thermal reservoir.

7. The apparatus of claim 1 including a spring connected to the frame and the plate array, and wherein the spring has a lower thermal conductivity than the plate array.

8. The apparatus of claim 1 wherein the rigid plates of the plate array and the heater have opposed flat surfaces biased toward each other such that a large area of contact is provided.

9. The apparatus of claim 8 wherein the area of contact is substantially coextensive with the plate array.

10. A method of preheating printer media in a printer having a printing station including a print head and a supporting member comprising the steps:

drawing a sheet of media from a media supply;

advancing the sheet toward a heater surface;

generating heat in the heater surface;

contacting a plate to the heater surface to heat the plate;

sliding the sheet across the heater surface;

while sliding the sheet across the heater surface, biasing the sheet against the heater surface and the plate toward the heater surface so the sheet is heated from both sides;

advancing the sheet toward a printing assembly; and generating an image on the sheet by:
1. applying a liquid transfer layer to the supporting member;
2. applying a phase change ink to the liquid transfer layer to form the image thereon; and
3. transferring the image to the sheet.

11. The method of claim 10 further including the step of preheating the plate prior to sliding the sheet by contacting the plate to the heater surface.

12. The method of claim 10 wherein the heater surface is thermostatically controlled.

13. The method of claim 12 wherein the plate is thermostatically controlled.

14. A method of preheating printer media in a printer comprising the steps:

drawing a sheet of media from a media supply;

heating a first heated element;

contacting an opposingly positioned second heated element to the first heated element to conduct heat to the second heated element;

advancing the sheet toward the first heated element and the second heated element;

contacting opposite sides of the sheet respectively with the first and the second heated element, such that the sheet is heated on both sides; advancing the sheet toward a printing station; and generating an image on the sheet by;
1. applying a liquid transfer layer to a supporting member;
2. applying a phase change ink to the liquid transfer layer to form the image thereon; and
3. transferring the image to the sheet.

15. The method of claim 14 further including the step of continuously advancing the sheet while contacting it with the heated elements.

16. The method of claim 14 wherein at least one of the heated elements is stationary with respect to the sheet such that the sheet slides across the stationary heated element.

* * * * *

UNITED STATES PATENT AND TRADEMARK OFFICE
CERTIFICATE OF CORRECTION

PATENT NO. : 5,691,756
DATED : November 25, 1997
INVENTOR(S) : James D. Rise, William Y. Pong, Timothy L. Crawford, Meade Neal, Larry E. Hindman and Carl T. Urban It is certified that error appears in the above-identified patent and that said Letters Patent is hereby corrected as shown below:

Column 6, line 47, after "the" change "flame" to --frame--;

Column 6, line 57, after "heater" delete "to accomodate";

Column 6, line 58, delete "media passing between the heater".

Signed and Sealed this

Third Day of February, 1998

Attest:

BRUCE LEHMAN

Attesting Officer

Commissioner of Patents and Trademarks